W. L. BLISS.
FOOT CAP.
APPLICATION FILED MAY 28, 1914.
1,238,738.  Patented Sept. 4, 1917.
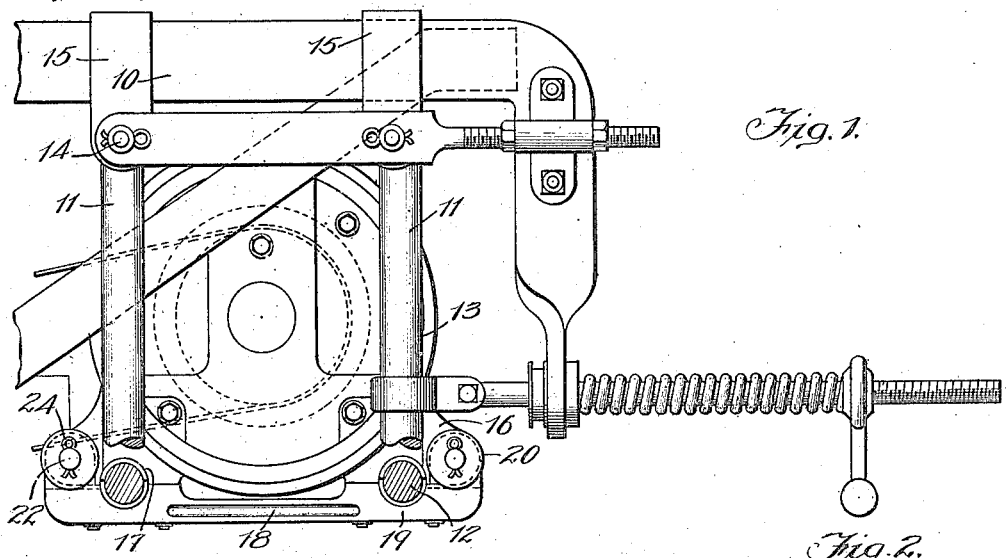
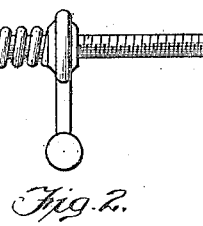
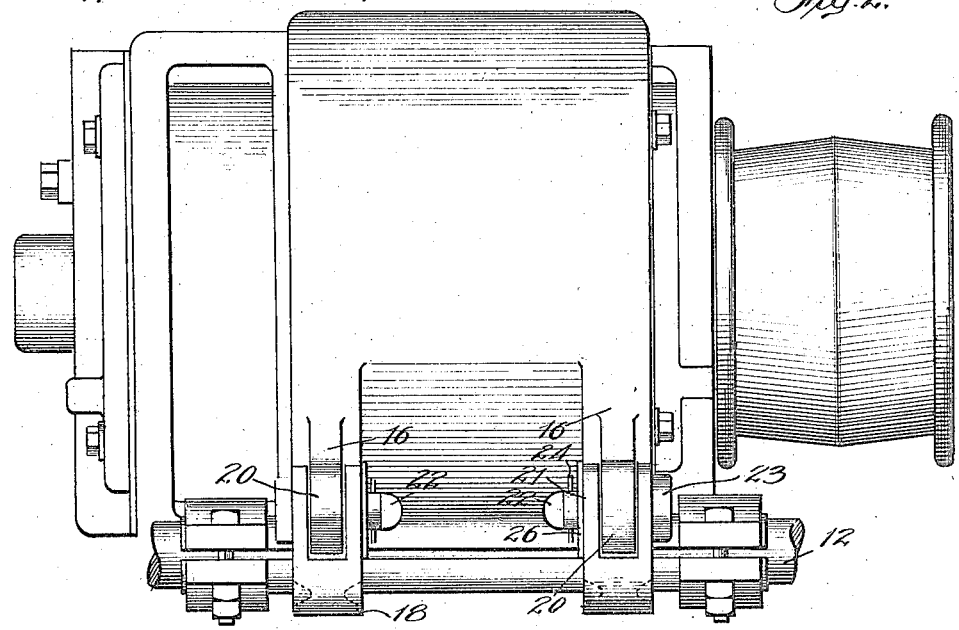
Witnesses:
Inventor:
William L. Bliss

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

FOOT-CAP.

1,238,738.

Specification of Letters Patent.

Patented Sept. 4, 1917.

Application filed May 28, 1914. Serial No. 841,471.

*To all whom it may concern:*

Be it known that I, WILLIAM L. BLISS, a citizen of the United States, residing at Niagara Falls, in the county of Niagara and State of New York, have invented new and useful Improvements in Foot-Caps, of which the following is a full, clear, concise, and exact description, reference being had to the accompanying drawing, forming a part of this specification.

My invention relates to foot-caps or devices for increasing the security with which generators may be attached to their supports.

In modern car lighting systems the generator is usually mounted on a suspension extending beyond the end of a car truck. One type of generator suspension that has come into extensive use includes a pair of substantially parallel suspension bars spaced apart and projecting beyond the end of a car truck. Supported by the suspension bars is a pair of slings, each having a substantially horizontal portion or cross-bar on which the generator is mounted. The generator is provided with a pair of downwardly extending feet or lugs on each side, which rest directly on the cross-bars. Foot-caps are bolted to the under side of the feet so that each foot, with its cap in place, forms a closed construction completely surrounding the cross-bars. In this way the generator is securely attached to its suspension. When it is desired to lift the generator from the cross-bars, it is necessary to unbolt the foot-caps and completely detach them from the generator feet.

One of the objects of the present invention is to provide means whereby the generator may be attached to or removed from its suspension with great facility.

Another object of the invention is to provide means for increasing the security of attachment of the generator to its suspension.

I have illustrated one embodiment of my invention in the accompanying drawings, in which—

Figure 1 is a view of a portion of a generator suspension showing one of the hinged foot-caps in side elevation.

Fig. 2 is an end view on an enlarged scale, of a portion of the construction shown in Fig. 1, and showing an end elevation of the hinged foot-caps.

Fig. 3 is a perspective view of one of the hinged foot-caps.

The generator suspension selected for the purpose of illustration includes a pair of substantially parallel suspension bars 10, spaced apart and projecting beyond the end of a car truck. Supported by the suspension bars is a pair of substantially U-shaped slings 11. Each sling has a substantially horizontal portion or cross-bar 12 and upwardly extending ends or links 13, pivoted at 14 to stirrups 15 carried by the suspension bars 10. The cross-bars 12 and the links 13 constitute what may be termed a swinging cradle upon which the generator is mounted. The generator is provided on each side with a pair of feet or lugs 16 by which it is supported on the cross-bars. Each foot of the generator is provided with a portion 17 which extends around the upper half of one of the cross-bars and conforms to the circular contour thereof.

The generator is held in place upon the cross-bars by a pair of continuous foot-caps 18, hingedly secured to the under side of the generator feet. Each foot-cap extends from one of the feet on one side of the generator to the opposite foot on the other side of the generator, and is formed near each end with a semi-circular portion 19 that surrounds the lower half of the cross-bar to provide a cap for the corrrsponding foot of the generator, and with the portion 17 of said foot, completely surrounds the cross-bar. Each foot of the generator is formed with a knuckle 20, while the foot-caps are provided at each end with a pair of upwardly extending substantially parallel knuckles 21. When the foot-caps are set in place beneath the generator, the knuckles 21 straddle the knuckles 20, and a hinge pin 22 is passed through alined openings in each set of knuckles. In this way the foot-caps are hingedly attached to the generator feet. The hinge pin is held in place by an enlarged head 23, formed at one end thereof, and a cotter pin 24 that extends through a transverse bore in the other end of the pin. A washer 26 is carried by the shank of the hinge pin between the cotter pin and the adjacent knuckle.

It is obvious from the foregoing that by removing the pins 22 from the hinges on one side of the generator, the foot-caps may be swung away from the cross-bars on the hinges on the other side of the generator. This improved construction provides means whereby the generator may be mounted upon or removed from the cross-bars with great facility by merely detaching the foot-caps from one side of the generator, thereby effecting a substantial saving in labor and expense. Furthermore, the security of attachment of the generator to the cross-bars is materially increased.

What I claim as new and desire to secure by Letters Patent of the United States is:—

1. In a combination, a generator, and a foot cap hingedly secured thereto.

2. In a combination, a generator, a support therefor, and means hinged to the generator and coöperating with said support for securing said generator to said support.

3. In combination, a generator suspension, a generator supported thereon, and means hinged to the generator and coöperating with said suspension for securing said generator to said suspension.

4. In combination, a car-lighting generator having a pair of oppositely arranged supporting elements adapted to rest on supporting members, a foot cap hingedly secured to said generator and adapted to coöperate with said supporting members to maintain said generator supporting elements in engagement with said supporting members.

5. In combination, a car-lighting generator having a plurality of supporting elements adapted to rest on supporting cross bars, a foot cap for maintaining the supporting elements in proper alinement on said cross bars, said foot cap being hingedly secured to said generator.

6. In combination, a car lighting generator having a plurality of supporting elements adapted to rest on supporting cross bars, and a hinged foot cap for maintaining said supporting elements in proper engagement with said cross bars, said foot cap being secured to said generator at a plurality of points of attachment.

7. In combination, a car-lighting generator having opposite pairs of downwardly extending supporting feet, each pair being adapted to rest on one of a pair of substantially parallel supporting cross bars, and hinged foot caps for securing each of a pair of oppositely disposed feet to said cross bars.

8. In combination, a car-lighting generator having opposite pairs of downwardly extending supporting feet, each pair being adapted to rest on one of a pair of substantially parallel supporting cross bars, and a hinged foot cap for securing each of a pair of oppositely disposed feet to said cross bars.

In witness whereof, I have hereunto subscribed my name in the presence of two witnesses.

WILLIAM L. BLISS.

Witnesses:
WM. A. FURBAYNE,
T. H. ZELLHOEFER.

Copies of this patent may be obtained for five cents each, by addressing the "Commissioner of Patents, Washington, D. C."